US008300360B2

(12) United States Patent
Bandic et al.

(10) Patent No.: US 8,300,360 B2
(45) Date of Patent: Oct. 30, 2012

(54) COMPLIANT AIR BEARING SLIDER

(75) Inventors: Zvonimir Z. Bandic, Santa Clara, CA (US); Jia-Yang Juang, Santa Clara, CA (US); Bernhard E. Knigge, San Jose, CA (US); Robert N. Payne, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1205 days.

(21) Appl. No.: 12/120,176

(22) Filed: May 13, 2008

(65) Prior Publication Data

US 2009/0284869 A1 Nov. 19, 2009

(51) Int. Cl.
*G11B 5/147* (2006.01)

(52) U.S. Cl. .................................................... 360/235.4

(58) Field of Classification Search ............... 360/235.4, 360/235.5, 234.5, 236.5, 236.6, 245.8, 235.7, 360/235.1, 245, 246.1, 234.9

See application file for complete search history.

(56) References Cited

U.S. PATENT DOCUMENTS 4,802,042 A 1/1989 Strom
5,825,587 A 10/1998 Bolasna et al.
5,910,865 A 6/1999 Wang et al.
6,181,518 B1 1/2001 Harris et al.
6,466,410 B2 10/2002 Polycarpou et al.
6,603,639 B1 8/2003 Polycarpou et al.
6,646,832 B2 11/2003 Anaya-Dufresne et al.
6,958,871 B2 * 10/2005 Hirano et al. .................. 360/31
7,016,139 B2 * 3/2006 Baumgart et al. .............. 360/75
7,061,722 B2 6/2006 Kohira et al.
7,193,806 B1 * 3/2007 Albrecht et al. ................ 360/75
7,215,500 B1 * 5/2007 Albrecht et al. ................ 360/75
7,233,451 B2 * 6/2007 Baumgart et al. .............. 360/25
7,262,938 B1 8/2007 McNeil et al.
7,277,252 B1 * 10/2007 Albrecht et al. ................ 360/75
7,312,941 B2 * 12/2007 Hirano et al. .................. 360/31
7,359,138 B1 * 4/2008 Albrecht et al. ................ 360/75
2005/0057833 A1 * 3/2005 Hirano et al. .................. 360/31
2005/0057834 A1 * 3/2005 Hirano et al. .................. 360/31

FOREIGN PATENT DOCUMENTS

JP 63298789 12/1988
JP 07073627 3/1995
WO WO-99/00792 1/1999

OTHER PUBLICATIONS

Kohira, et al., “Friction Force of Negative Pressure Sliders for Proximity Recording”, *IEEE Transactions on Magnetics*, vol. 33, No. 5, (Sep. 1997),3157-3159.
Li, et al., “Intermolecular Force, Surface Roughness, and Stability of Head-Disk Interface”, *Journal of Applied Physics*, 97, (May 17, 2005),1-3.
Zhou, et al., “Slider Vibration Reduction Using Slider Surface Texture”, *Microsystem Technologies*, vol. 11, No. 8-10, (Aug. 2005),857-866.

* cited by examiner

*Primary Examiner* — Allen Cao

(57) ABSTRACT

A compliant, flexible air bearing slider (ABS) reduces the contact forces between the slider and disk, thereby reducing excessive burnishing and wear and increasing the reliability of the slider. According to an embodiment, an ABS has at least one “compliance-enhancing feature” which reduces the bending mode vibration frequency of the slider. By causing the slider to flex, and bringing the bending mode vibration frequency closer to the pitch 2 eigenmode frequency, coupling of the different vibration modes can be obtained. Thus, the different vibration modes can effectively dampen each other and result in reduced contact forces between the slider and disk.

25 Claims, 17 Drawing Sheets

CONTROLLER UNIT 160
HOST SYSTEM 180
ACTUATOR CONTROL/DRIVE 166
READ/WRITE CHANNEL 168
SPINDLE CONTROL/DRIVE 170
110
132
134
150
152
114
112
140
116
120

COMPLIANT AIR BEARING SLIDER

TECHNICAL FIELD

Embodiments of the invention relate generally to the field of hard disk drives and, more specifically, to a compliant air bearing slider (ABS).

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Hard disk drive devices are configured with read/write heads for reading data from and writing data to rotating disks. During operation, at times the heads and disks come into contact. Sometimes this contact is unintentional or undesirable, e.g., due to an asperity on a disk or slider vibration modes, and sometimes the contact is intentional, e.g., to calibrate and manage the fly height of the heads over the disks such as with thermal fly height (TFC) control. Regardless, even if the head-disk contact is intentional, such contact can cause excessive heat, wear, friction, burnishing and/or other damage to the heads, as well as damage to the disks. This is especially true when the heads and disks contact with significant force. For at least these reasons, managing the contact forces between read/write heads and disks in a hard disk drive is desirable.

SUMMARY OF EMBODIMENTS OF THE INVENTION

Components for a hard disk drive (HDD) with a compliant air bearing slider (ABS) are described. A compliant, flexible ABS reduces the contact forces between the slider and disk, thereby reducing excessive burnishing and wear and increasing the reliability of the slider. Historically, in the context of slider vibrations, sliders were designed with primary consideration to pitch eigenmode frequencies, i.e., rigid body motion. By contrast, according to an embodiment, an ABS has at least one "compliance-enhancing feature" which enhances the compliance of the slider and reduces the bending mode vibration frequency of the slider. By causing the slider to flex, and bringing the bending mode vibration frequency closer to the pitch 2 eigenmode frequency, coupling of the different vibration modes can be obtained. The different vibration modes can effectively dampen each other and result in reduced contact forces between the slider and the disk, and a reduced minimum flying height.

In addition to a reducing stiffness, the compliance-enhancing feature reduces the slider mass, which increases the slider eigenmode frequencies and hence improves slider compliance to the disk. Furthermore, with reduced slider mass the contact forces are typically lower, and with an increased slider eigenmode frequency the eigenmode amplitude is also reduced (e.g., less bouncing).

According to various embodiments, compliance-enhancing features of the slider include one or more vertical or transverse recesses or holes configured near the pitch 2 nodal line, which results in a more flexible slider. Furthermore, the compliance-enhancing features of the slider may include a transverse through-hole or deep trench near the pitch 1 and/or pitch 2 nodal lines, which also results in a more flexible slider. Still further, a thinner slider and/or a slider material with a smaller Young's modulus (relative to prior slider designs) can be used, e.g., in conjunction with a compliance-enhancing feature.

The foregoing slider features can (a) decrease the stiffness of the slider and (b) decrease the mass of the slider which, in turn, leads to an increase of the slider pitch 2 eigenmode frequency. A higher pitch 2 eigenmode frequency leads to improved slider disk compliance.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Figure 1:
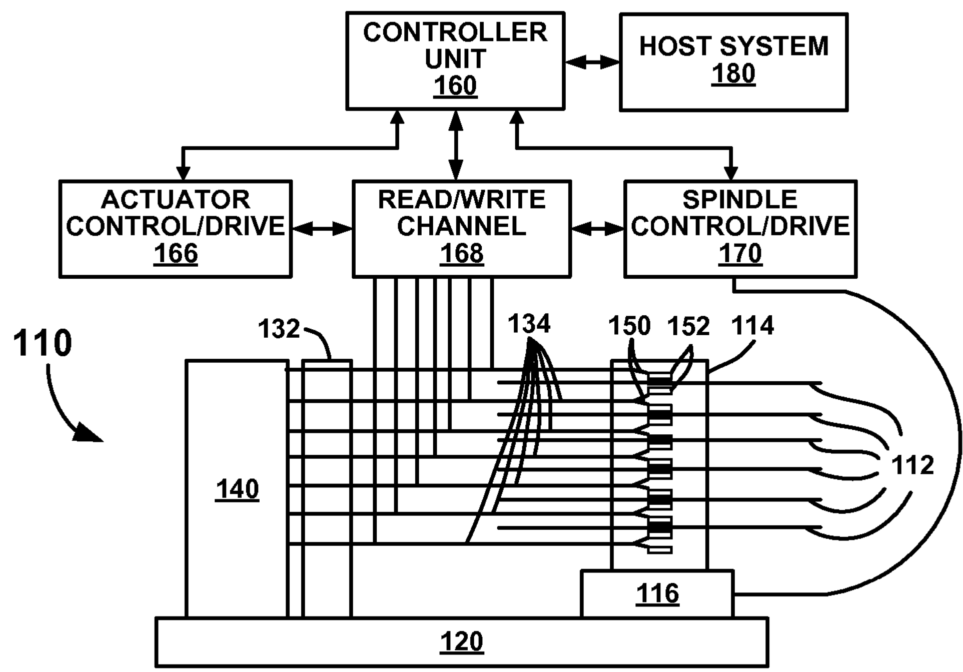
FIG. 1 illustrates a side view of a disk drive system, according to an embodiment of the invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

Embodiments of the invention comprise components and assemblies for a hard disk drive (HDD) device with a compliant air bearing slider. According to an embodiment, the air bearing slider is configures with at least one "compliance-enhancing feature" which reduces the contact forces between the slider and disk, thereby reducing excessive burnishing and wear and increasing the reliability of the slider. A purpose of a stiffness-reducing aspect of the compliance-enhancing feature(s) of the compliant air bearing slider is to reduce the bending mode vibration frequency of the slider. By causing the slider to flex, and bringing the bending mode vibration frequency closer to the pitch 2 eigenmode frequency, coupling of the different vibration modes can be obtained. The different vibration modes may effectively dampen each other and result in reduced contact forces between the slider and disk. A purpose of a mass reducing aspect of the compliance-enhancing feature leads to an increase of the pitch 2 eigenmode frequency and hence improves the slider to disk compliance.

It should be understood by those skilled in the art that various embodiments of the invention increase the performance quality of a hard disk drive (HDD) by reducing contact forces between heads and disks.

Numerous specific embodiments will now be set forth in detail to provide a more thorough understanding of the present technology. The discussion of these detailed embodiments will begin with an overview of a hard disk drive (HDD), and the components connected therein, according to embodiments of the invention. The discussion will then focus on embodiments of the invention that provide a compliant air bearing slider having compliance-enhancing feature(s), and corresponding HDD devices.

Although embodiments of the present invention will be described in conjunction with an air bearing slider in a hard disk drive, it is understood that the embodiments described herein are useful outside of the art of HDD design, manufacturing and operation. The utilization of the HDD slider example is only one embodiment and is provided herein merely for purposes of brevity and clarity.

Hard Disk Drive (HDD) Configuration

Figure 2:
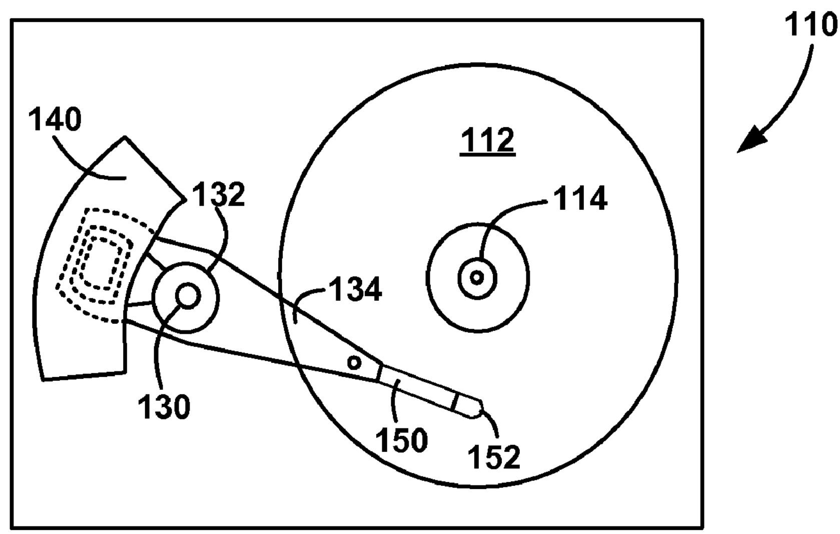
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Air Bearing Slider (ABS)

Air bearing sliders (or, simply "sliders") are designed with a relatively complex aerodynamic surface in order to optimize, among other attributes, the fly height of read/write heads over corresponding disks. The ABS surface is typically designed with two pitch nodal lines, P1 (pitch 1) and P2 (pitch 2), at which the ABS rotates in a pitch direction relative to the airflow. Further, based on the dynamics of rigid body motion, each pitch nodal line corresponds to a particular frequency of vibration of the slider, i.e., vibration modes.

Figure 3:
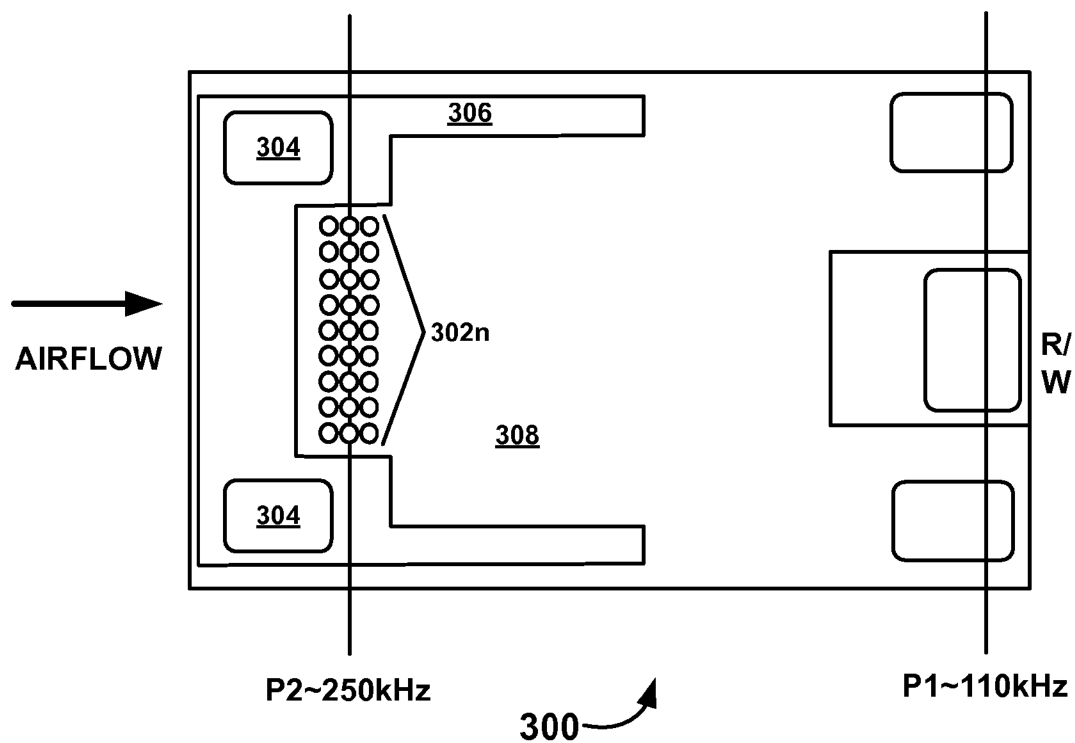
FIG. 3 is a bottom view illustrating an example air bearing slider (ABS), according to an embodiment of the invention.

FIG. 3 is a bottom view illustrating an example air bearing slider (ABS) 300, according to an embodiment of the invention. The bottom view of ABS 300 crudely depicts a three-etch air bearing surface, with each etch depth denoted by corresponding shading. In the illustrated example ABS 300, a P1 nodal line corresponds to a frequency of approximately 110 kHz and a P2 nodal line corresponds to a frequency of approximately 250 kHz. Thus, when the slider contacts the disk at the trailing end it will cause a rotation about the P2 nodal line and the slider will vibrate around 250 kHz, and when the slider contacts the disk towards the leading edge it will cause a rotation about the P1 nodal line and the slider will vibrate around 110 kHz. However, in operation the majority of contact vibrations occur at the trailing end and are associated with P2 mode vibrations.

Furthermore, sliders also naturally have torsion and bending modes, which correspond to how the whole slider structure flexes. Thus, the torsion and bending modes are relative to the slider's stiffness. These modes correspond to a particular resonant frequency. For non-limiting examples, a torsion resonant frequency for a pico slider may be 1.3 MHz and a bending resonant frequency for a pico slider may be 1.6 MHz. Upon contact at the trailing end of the slider, as is typical in operation, the bending mode is excited. A high bending mode frequency corresponds to a relatively stiff slider.

Air Bearing Slider Compliance-Enhancing Features

In the context of slider to disk contact, it is beneficial to minimize or reduce contact forces. Reducing contact forces can be enabled by producing an ABS that is compliant, or easy to bend. Furthermore, because the slider eigenmode frequency ♦ is related to the slider stiffness k and the slider mass m by the following equation, $\omega=\sqrt{k/m}$, reducing the slider mass causes the frequency to increase. Hence, by reducing the slider mass, reduced contact force and increased slider pitch eigenmode frequencies are achieved, as well as increased slider to disk compliance.

ABS Holes and Recesses

One approach to reducing the amplitude of the contact forces between the slider and disk, and the consequent head vibrations (e.g., the P2 vibration intensity), is to reduce the stiffness of the slider. According to an embodiment, one approach to controlling the stiffness of an ABS, i.e., producing a compliant slider, is to manufacture recesses and/or holes in the slider. Such "holes" are all the way through the slider and such "recesses" are not all the way through the slider. Furthermore, using recesses and or holes at selective locations of the slider body can preserve the stiffness of the slider in other directions can control the crown and camber of the slider.

Returning to FIG. 3, according to an embodiment of the invention, a number of compliance-enhancing features 302*n* are depicted in ABS 300. The number, size, and configuration of the compliance-enhancing feature 302*n* depicted in FIG. 3 are non-limiting and are for purposes of example. Therefore, the number, size, and configuration of the compliance-enhancing feature may vary from implementation to implementation.

In the case of holes it is preferable, but not limiting, to configure such compliance-enhancing feature 302*n* away from the two most prominent air bearing etch depths, such as etch depth 304 and etch depth 306. That is, it is preferable for flight stability that stiffness-reducing and mass-reducing holes are in the deep etch area 308 of the air bearing surface. However, in the case of recesses from the slider surface opposing the air bearing surface (e.g., if the air bearing surface is the "bottom" surface, then the slider surface opposing the air bearing surface is the "top" surface), such recesses can be configured over any of the etch depths 304, 306, 308 without having much detrimental effect on the slider flying characteristics.

According to an embodiment of the invention, and as depicted in FIG. 3, the compliance-enhancing features are configured on, near, and/or around the P2 nodal line. Such a configuration of compliance-enhancing features helps reduce slider mass and P2 mode stiffness and, consequently, the P2 mode vibrations resulting from slider-disk contact.

Figure 4A:
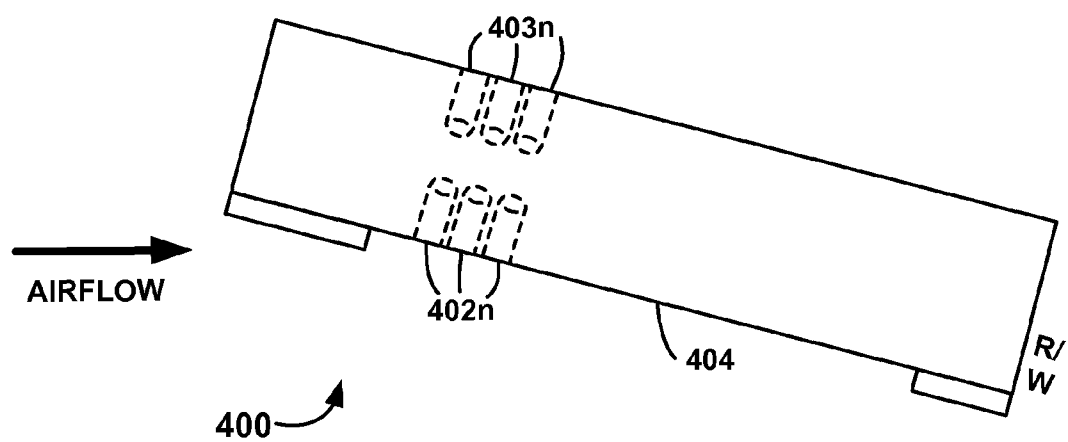
FIG. 4A depicts an example air bearing slider (ABS) comprising a compliance-enhancing feature comprising a number of recesses from an air bearing surface, and a number of recesses from a slider surface opposing the air bearing surface, according to an embodiment of the invention.
Figure 4B:
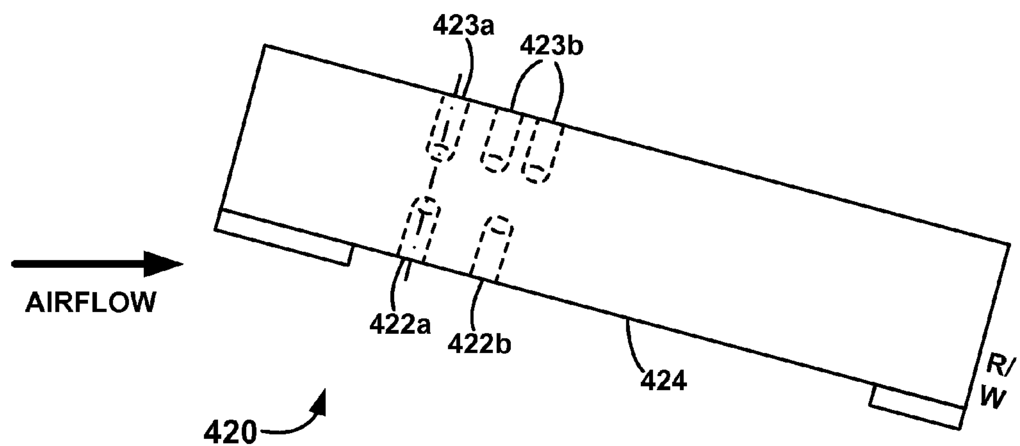
FIG. 4B depicts an example air bearing slider (ABS) comprising a compliance-enhancing feature comprising a number of recesses from an air bearing surface, and a number of recesses from a slider surface opposing the air bearing surface, according to an embodiment of the invention.
Figure 4C:
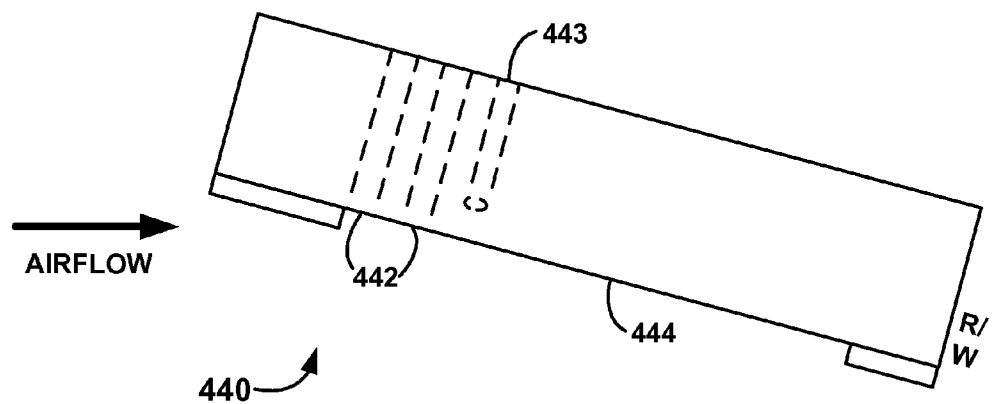
FIG. 4C depicts an example air bearing slider (ABS) comprising a compliance-enhancing feature comprising a number of through-holes through both an air bearing surface and a slider surface opposing the air bearing surface, according to an embodiment of the invention.

FIGS. 4A, 4B, and 4C are side views illustrating respective examples of air bearing sliders, according to various embodiments of the invention. FIG. 4A depicts an air bearing slider (ABS) 400 comprising a compliance-enhancing feature comprising a number of recesses 402*n* from air bearing surface 404, and a number of recesses 403*n* from a slider surface opposing air bearing surface 404. The diameter, depth, number and location of recesses 402*n* and 403*n* may vary from implementation to implementation, and are depicted as they are in FIG. 4A for purposes of example. FIG. 4A is used mainly to illustrate an embodiment comprising one or more recesses from each of the air bearing and the opposing surfaces.

FIG. 4B depicts an air bearing slider (ABS) 420 comprising a compliance-enhancing feature comprising a recess 422*a* and a recess 422*b* from air bearing surface 424, and recess 423*a* and a number of recesses 423*b* from a slider surface opposing air bearing surface 424. FIG. 4B is used mainly to illustrate (1) an embodiment comprising one or more arbitrarily shaped (e.g., coaxial, square, oval, etc.) recesses from each of the air bearing and the opposing surfaces, i.e., recess 422*a* and recess 423*a*; and (2) an embodiment comprising one or more non-coaxial recesses from each of the air bearing and the opposing surfaces, i.e., recess 422*b* and recesses 423*b*. By making holes or recessed features to the slider body air bearing side, air pockets are created. These air pockets provide damping benefits and reduce the slider maximum peak pressure. These air pockets can also function to trap lubricant and debris.

FIG. 4C depicts an air bearing slider (ABS) 440 comprising a compliance-enhancing feature comprising a number of through-holes 442 through both air bearing surface 424 a slider surface opposing the air bearing surface 444. This illustrates that holes may used in addition to or alternatively from recesses, in order to make a more compliant ABS. However, as mentioned, if through-holes are used as the compliance-enhancing feature, then the prominent air bearing etch depth features should preferably be avoided. Additionally, ABS 440 comprises a recess 443 from the slider surface opposing the air bearing surface 444, to depict as a non-limiting example, that a compliant ABS may be configured with stiffness-reducing holes, recesses, or a combination of holes and recesses.

Figure 5A:
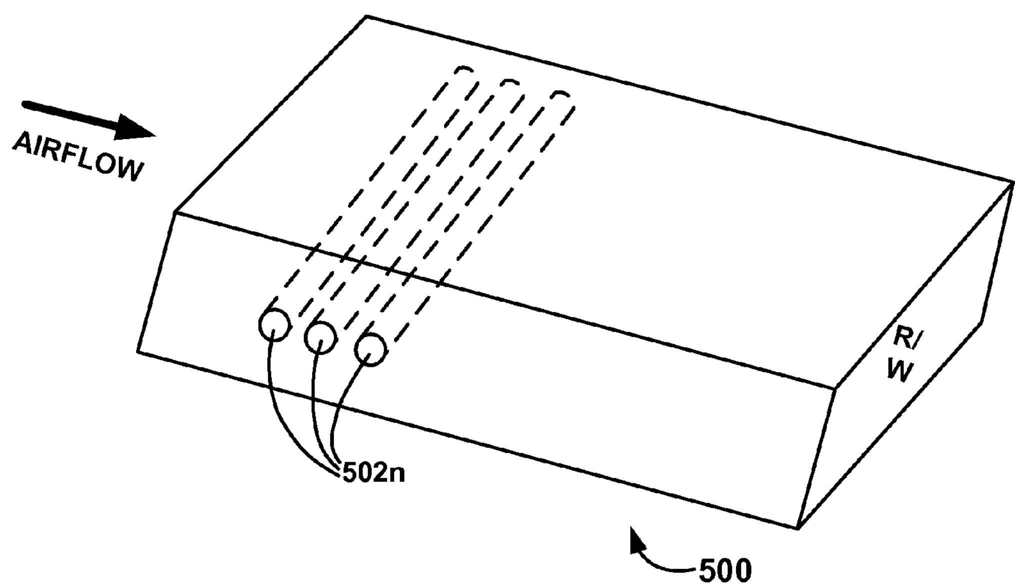
FIG. 5A depicts an example air bearing slider (ABS) comprising a number of transverse holes, according to an embodiment of the invention.
Figure 5B:
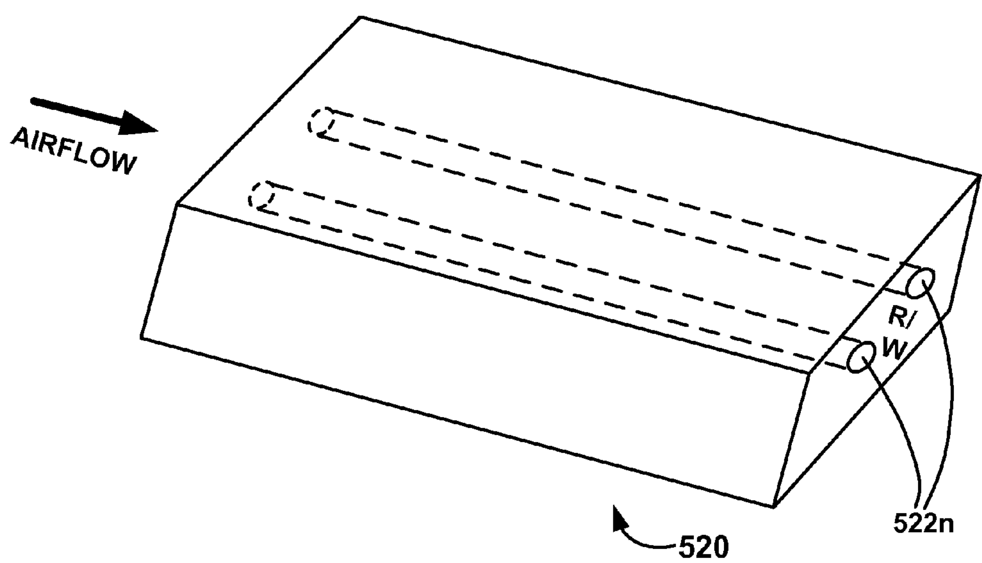
FIG. 5B depicts an example air bearing slider (ABS) comprising a number of longitudinal recesses, according to an embodiment of the invention.

FIGS. 5A and 5B are isometric views illustrating respective examples of air bearing sliders, according to various embodiments of the invention. FIG. 5A depicts an air bearing slider (ABS) 500 comprising a number of stiffness and/or mass-reducing holes 502*n* transverse to ABS 500. FIG. 5B depicts an air bearing slider (ABS) 520 comprising a number of stiffness-reducing and/or mass-reducing recesses 522*n* longitudinal to ABS 520. The diameter, number and location of transverse holes 502*n* and longitudinal recesses 522*n* may vary from implementation to implementation, and are depicted as they are in FIGS. 5A and 5B for purposes of example. FIGS. 5A and 5B are used mainly to illustrate respective embodiments comprising one or more transverse or longitudinal holes and/or recesses.

Several different configurations of compliance-enhancing feature are depicted in FIGS. 4A-4C and FIGS. 5A-5B, for purposes of example. However, those skilled in the art will recognize that the configuration of compliance-enhancing feature may vary from implementation to implementation, and may be based on the physical properties of the ABS under consideration, rigid body motion modeling and analysis, torsion and bending mode modeling and analysis, and the like.

ABS Trenches and Through-Holes

Figure 6:
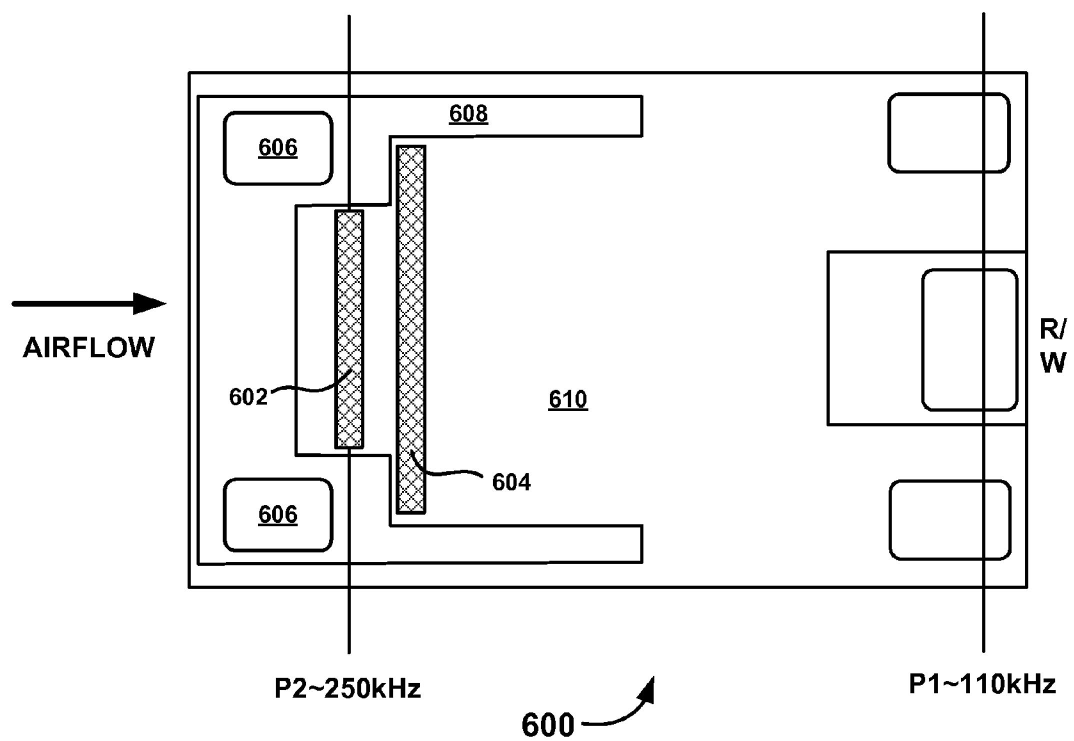
FIG. 6 is a bottom view illustrating an example air bearing slider (ABS) comprising a compliance-enhancing feature, according to an embodiment of the invention.

FIG. 6 is a bottom view illustrating an example air bearing slider (ABS) 600, according to an embodiment of the invention. The bottom view of ABS 600 crudely depicts a three-etch air bearing surface comprising etch depth 606, etch depth 608 and deep etch depth 610, with each etch depth denoted by corresponding shading. In the illustrated example ABS 600, a P1 nodal line corresponds to a frequency of approximately 110 kHz and a P2 nodal line corresponds to a frequency of approximately 250 kHz.

According to an embodiment, ABS 600 comprises a transverse trench 602 in the deep etch depth 610 of the air bearing surface. According to an embodiment, the transverse trench 602 is configured on the P2 nodal line where such a configuration of a stiffness-reducing feature helps to reduce P2 mode stiffness and, consequently, the P2 mode vibrations resulting from slider-disk contact. Additionally or alternatively, ABS 600 is depicted with transverse trench 604 in the deep etch 610. According to an embodiment, the transverse trench 604 is configured aft of the P2 nodal line. This configuration of a stiffness-reducing feature also helps to reduce P2 mode stiffness. These trenches also increase slider damping and help trap lubricant and debris from the interface. This is increasingly important for patterned media applications. If the trenches are located near the trailing end (towards the P1 nodal line) they also reduce the maximum peak pressure near the RW element leading to less lubricant disturbance.

Not only does the transverse trench 602 affect the P2 mode stiffness of ABS 600, but also the bending stiffness of ABS 600. For a non-limiting example based on modeling, a 100 micron wide, 100 micron deep notch around the P2 nodal line may reduce the bending mode vibration frequency from approximately 1.66 MHz to approximately 1.24 MHz. Thus, a compliance-enhancing feature(s) can be used to move the bending mode vibration frequency closer to the P2 nodal vibration frequency (i.e., the eigenmode frequency) of the slider 600 to achieve coupling of the vibrations. Due to such coupling, each mode of vibration (i.e., rigid body mode and bending mode) can effectively dampen the other mode. This approach to ABS design, involving configuring the bending mode vibration frequency closer to the P2 eigenmode frequency, is further exemplified as follows.

Figure 7A:
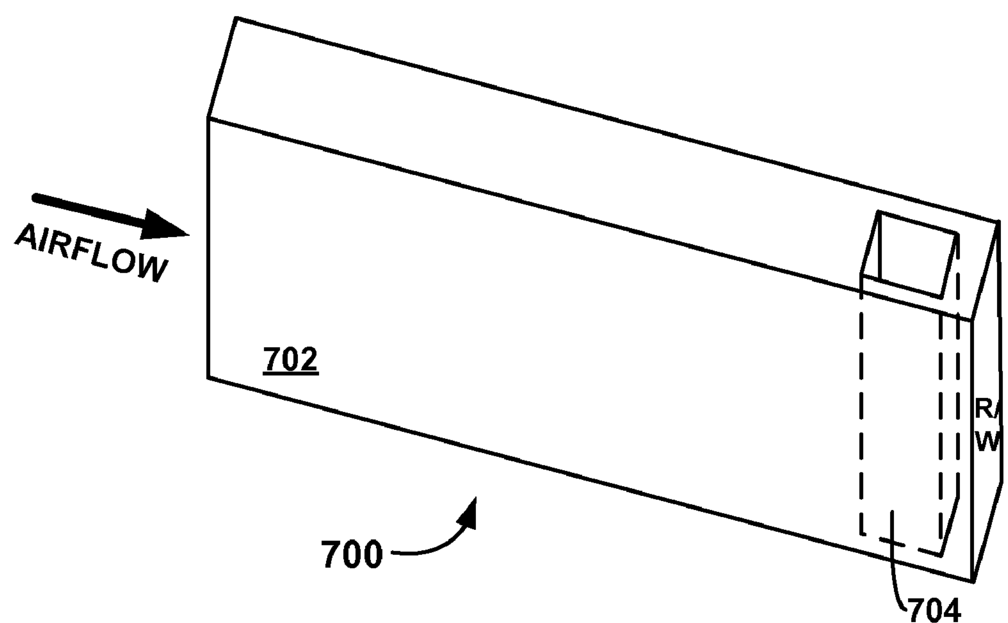
FIG. 7A is a bottom isometric view illustrating an example air bearing slider (ABS) comprising a compliance-enhancing feature, according to an embodiment of the invention.

According to an embodiment, another compliance-enhancing feature that can affect the location of the bending mode vibration frequency is a transverse through-hole at or near the P1 nodal line. FIG. 7A is a bottom isometric view illustrating an example air bearing slider (ABS) 700, according to an embodiment of the invention. The air bearing features are not depicted in FIG. 7A, but surface 700 represents the air bearing surface. A transverse through-hole 704 near the P1 nodal line affects the bending stiffness of ABS 700. For a non-limiting example based on modeling, a 200 micron by 200 micron rectangular through-hole near the P1 nodal line may reduce the bending mode vibration frequency from approximately 1.66 MHz to approximately 1.2 MHz. Thus, transverse through-hole 704 can be used to move the bending mode vibration frequency closer to the P2 nodal vibration frequency (i.e., the eigenmode frequency) of the slider 700 to achieve coupling of the vibrations.

One approach to manufacturing a transverse through-hole in an ABS, such as through-hole 704 of FIG. 7A, is to manufacture a trench into the end of the slider block and to fuse an end cap over the trench using heat, thereby forming an enclosed through-hole. Being a slider-level process prior to depositing the read/write elements, the slider material can be subjected to high temperatures for fusing the cap to the main slider body without damage to the sensitive read/write elements.

Figure 7B:
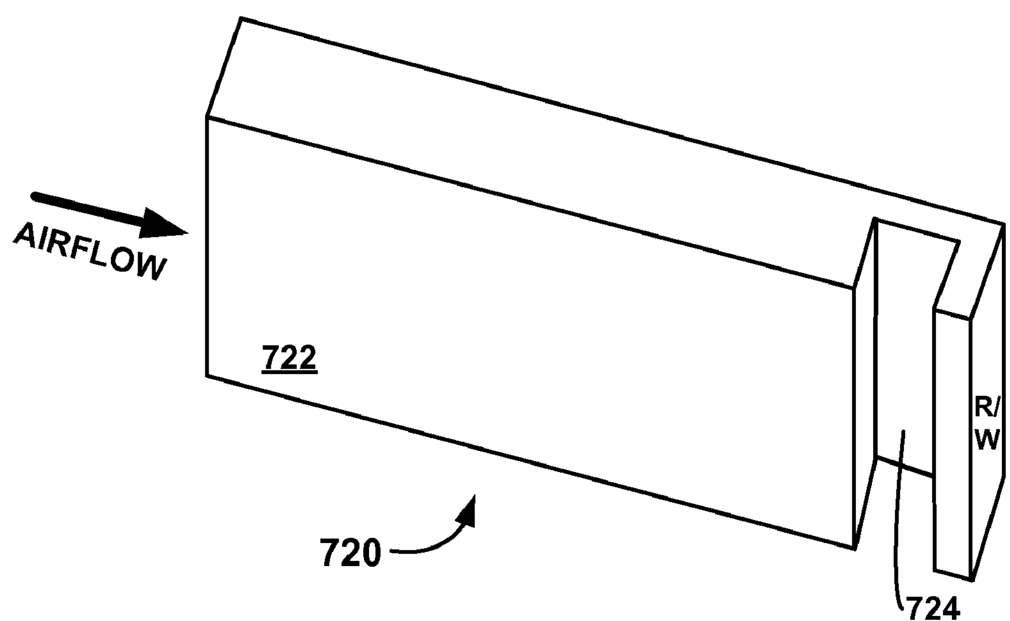
FIG. 7B is a bottom isometric view illustrating an example air bearing slider (ABS) comprising a compliance-enhancing feature, according to an embodiment of the invention.

According to an embodiment, another compliance-enhancing feature that can affect the location of the bending mode vibration frequency is a transverse trench at or near the P1 nodal line. FIG. 7B is a bottom isometric view illustrating an example air bearing slider (ABS) 720, according to an embodiment of the invention. The air bearing features are not depicted in FIG. 7B, but surface 722 represents the air bearing surface. The transverse trench 724 near the P1 nodal line affects the bending stiffness of ABS 720. For a non-limiting example based on modeling, a trailing end transverse trench 150 micron wide by 220 micron deep trench near the P1 nodal line may reduce the bending mode vibration frequency from approximately 1.66 MHz to approximately 730 kHz. Thus, transverse trench 724 can be used to move the bending mode vibration frequency closer to the P2 nodal vibration frequency (i.e., the eigenmode frequency) of the slider 720 to achieve coupling of the vibrations. The depth of the transverse trench 724 may vary from implementation to implementation, but should generally be deep enough to substantially affect the rigidity of the ABS. For a non-limiting example, the depth of such a trench is preferably at least 10% of the slider thickness, in order to provide a preferable effect on the stiffness and/or mass of the slider.

Note that use of transverse through-holes and/or trenches near the P1 nodal line, as depicted in FIGS. 7A and 7B, may additionally or alternatively be configured near the P2 nodal line.

Down-track jitter should be considered in the design and optimization of any stiffness-reducing feature near the P1 nodal line, such as with transverse through-hole 704 of ABS 700 (FIG. 7A) or transverse trench 724 of ABS 720 (FIG. 7B). That is, care should be taken not to introduce too little stiffness near the P1 nodal line which might allow the down-track jitter to significantly degrade the stability of read/write operations.

The foregoing compliance-enhancing features can be used to configure the bending mode vibration frequency as close as desirable to the P2 eigenmode frequency, or even to the P2 eignemode frequency. However, configuring the bending mode vibration frequency to within approximately 300 kHz of the P2 eigenmode frequency is in most cases close enough to provide the desired coupling of vibrations in order for the vibration modes to effectively "absorb" each other. However, configuring the bending mode frequency of a slider to within approximately 800 kHz of the P2 eigenmode frequency of the slider provides substantial benefits as described herein.

If the ABS is configured with a compliance-enhancing feature such that the bending mode vibration frequency and the P2 eigenmode frequency are approximately the same, then according to an embodiment, the ABS is configured with an active damper element to ensure the vibration modes are out of phase with each other. For a non-limiting example, the ABS may be configured with a piezoelectric element, such as a layer or plate, to actively cancel in-phase bending mode vibrations.

ABS Materials and Thickness

Another approach to controlling the bending stiffness of an air bearing slider is based on the choice of slider material and/or the thickness of the slider. Typically, a pico slider is around 300 microns thick and a femto slider is around 230 microns thick. Thus, a "thinner" slider could be characterized as a slider in the range of 125-200 microns thick. Thinner sliders can assist in reducing the contact forces, but one downside to thinner sliders is increased crown and camber sensitivity. An increase in crown due to a thinner slider can be compensated for by using any of the foregoing compliance-enhancing features, according to an embodiment of the invention.

Air bearing sliders are typically manufactured from AlTiC. However, use of one or more different materials having a Young's modulus smaller than AlTiC results in a more flexible slider and, therefore, reduces the contact forces and associated detrimental effects. According to an embodiment, an air bearing slider is manufactured from $SiN_x$, which has a smaller Young's modulus than AlTiC and, thus, is a more compliant slider. If a silicon slider is used, the fabrication of the recesses and/or holes can be integrated with a DRIE (Deep Reactive Ion Etching) step used to separate sliders, which would essentially come at no cost.

Another approach to manufacturing a compliant slider is based on a laminate wafer used for fabricating recording heads. According to an embodiment of the invention, a compliant air bearing slider comprises multiple portions along the longitudinal direction of the slider, where at least one of the portions has a smaller Young's modulus than at least one of the other portions. For example, a first portion at the slider leading edge and a third portion at the slider trailing edge are made of a first material having a first Young's modulus, whereas a second portion (a "compliant portion") between the first and third portions is made of a second material having a second Young's modulus that is less than the first Young's modulus. Fabrication of the recording heads may proceed as is typical, however, when the heads are completed the compliant portion acts as a spring in the fabricated slider. The position and thickness of the compliant portion of the slider may vary from implementation to implementation, as required or desired for the particular slider design. According to an embodiment, a compliant longitudinal portion is used in conjunction with a compliant layer (a layer with smaller Young's modulus than other layers) to form a compliant "tee" or cross structure within the slider.

Finite Element Analysis

Figure 8A:
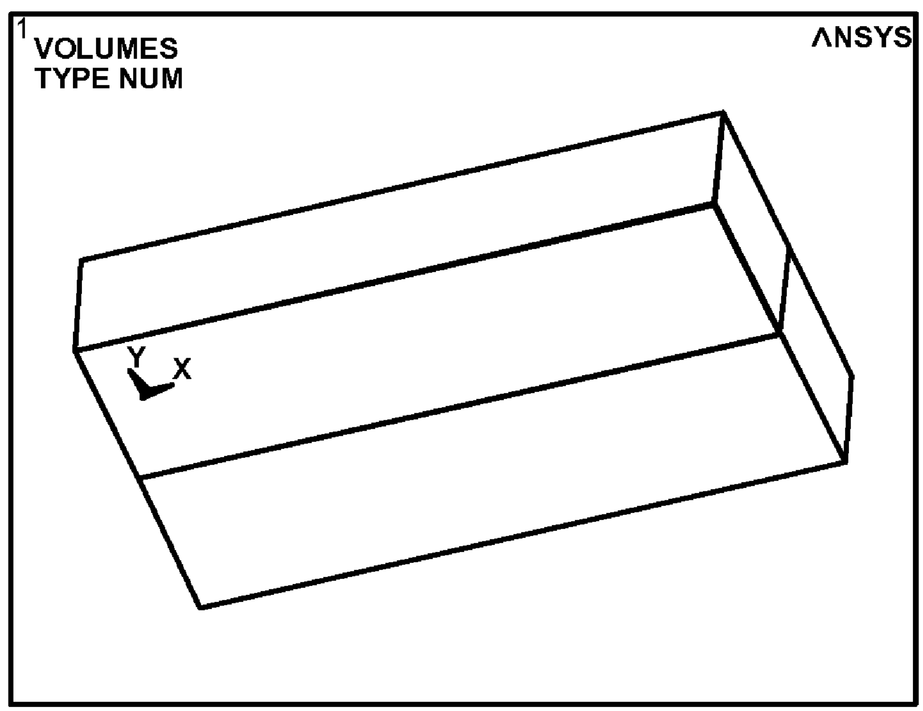
FIGS. 8A-8E are diagrams illustrating five respective slider configurations analyzed for benefits based on compliance-enhancing features, according to embodiments of the invention.
Figure 8B:
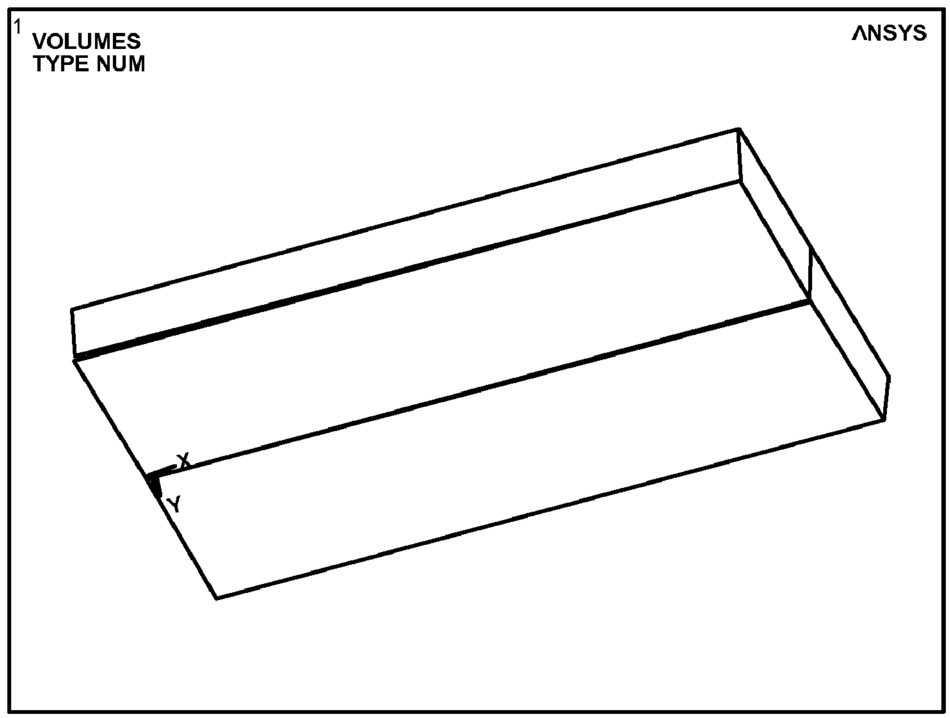
Figure 8C:
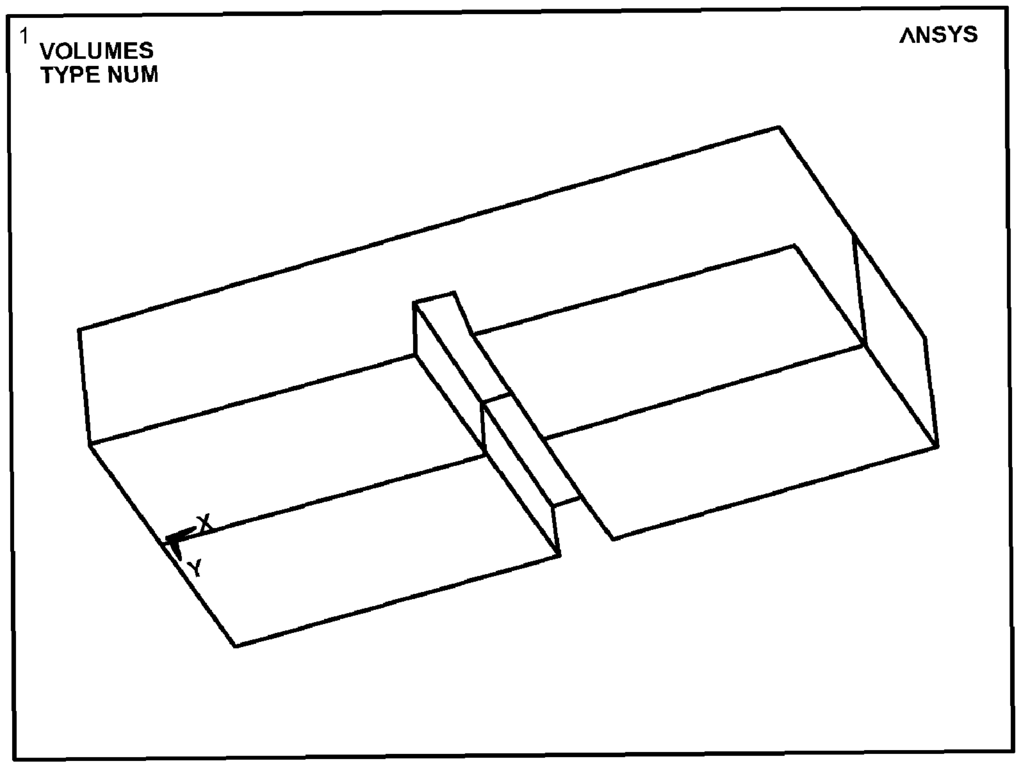
Figure 8D:
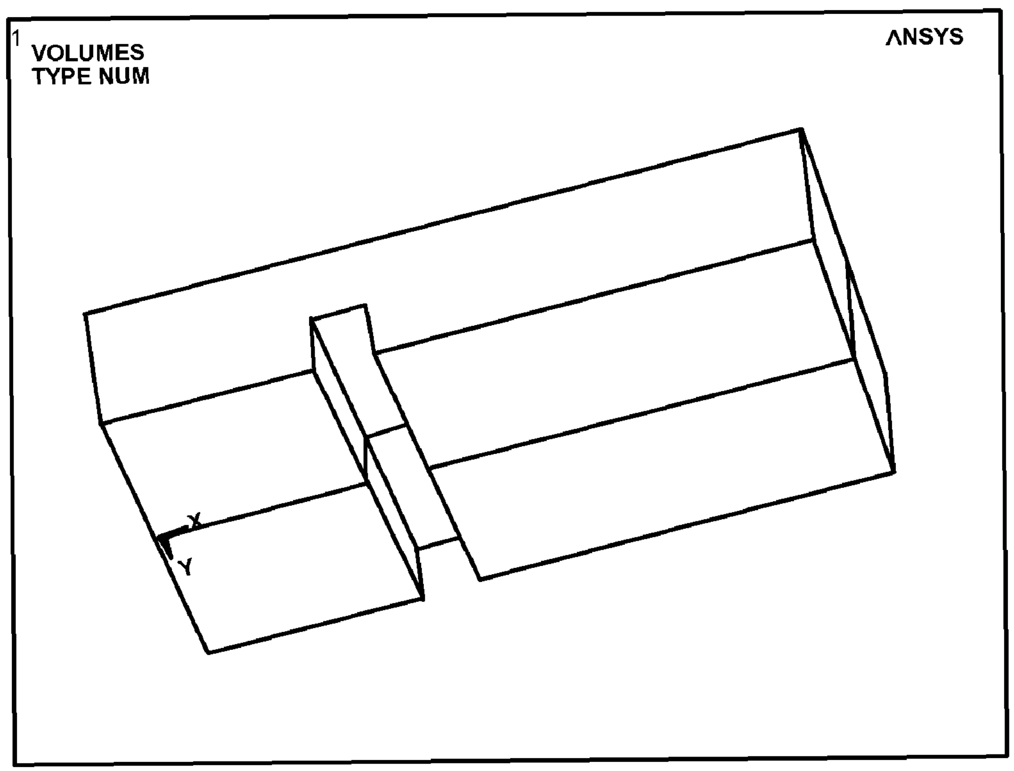
Figure 8E:
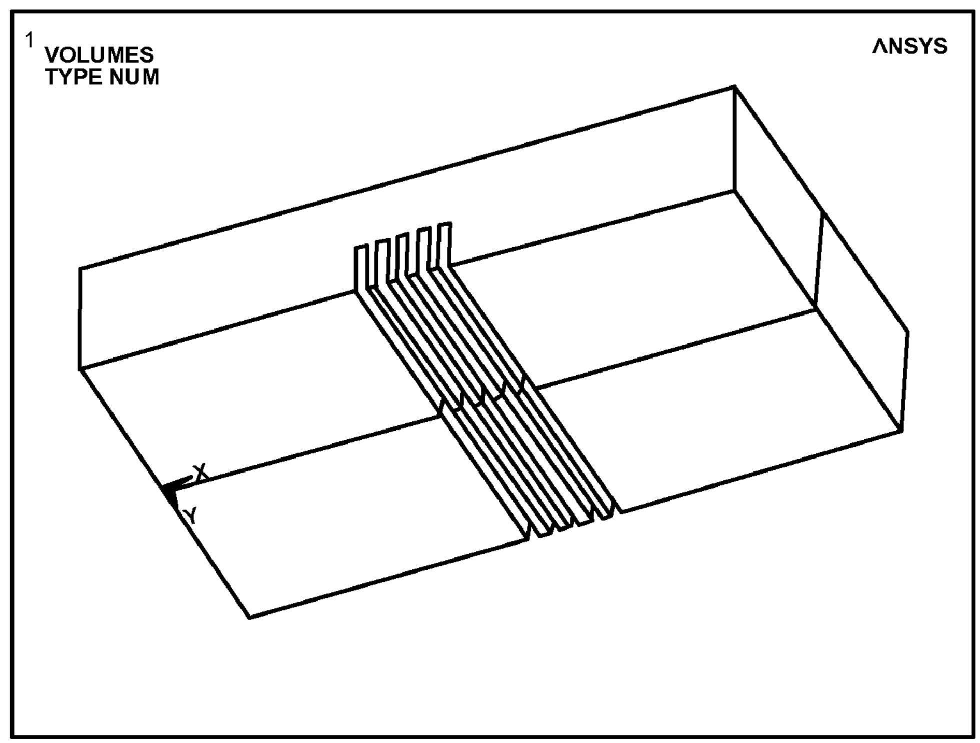

FIGS. 8A-8E are diagrams illustrating five slider configurations analyzed for benefits based on compliance-enhancing features, according to embodiments of the invention. FIG. 8A illustrates Case1: Normal Slider 230 um×1250 um×700 um. FIG. 8B illustrates Case2: Thin slider 115 um×1250 um×700 um. FIG. 8C illustrates Case3: Normal Slider with one 100 um trench at center. FIG. 8D illustrates Case4: Normal Slider with one 100 um trench at P2 nodal line. FIG. 8E illustrates Case5: Normal Slider with five 20 um trenches at center.

Figure 9:
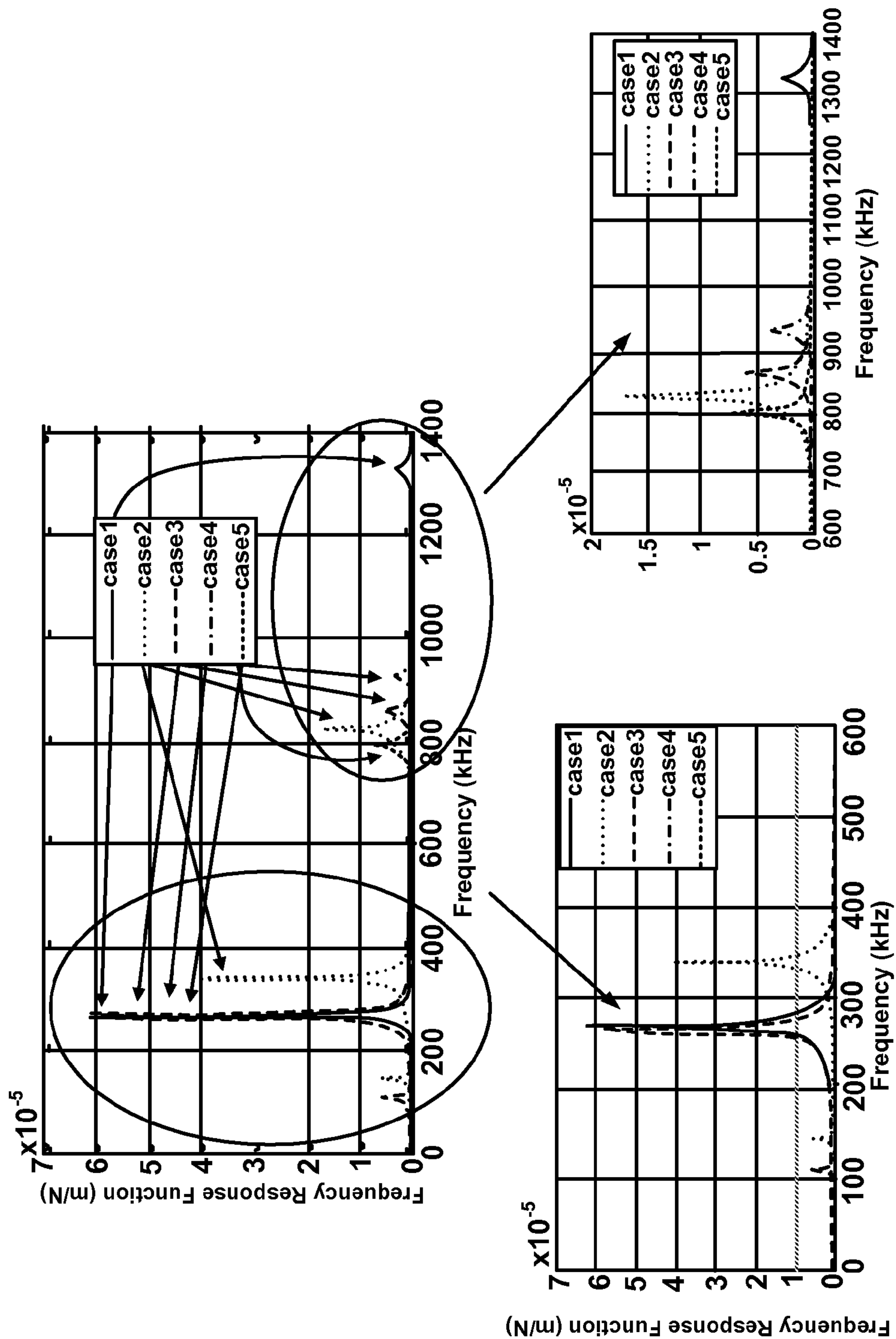
FIG. 9 is a diagram illustrating the respective transfer functions for slider impacting disk for the five slider configurations depicted in FIGS. 8A-8E, according to embodiments of the invention.

FIG. 9 is a diagram illustrating the respective transfer functions for slider impacting disk for the five slider configurations depicted in FIGS. 8A-8E, according to embodiments of the invention. The effects of the compliance-enhancing features involved in the analysis comprise the stiffness-reducing and mass-reducing aspects of such features. As is shown by the transfer functions illustrated in FIG. 9, reducing the slider thickness by half (115 um vs. 230 um; Case2 vs. Case1) makes the slider more flexible and reduces the mass, which reduces the bending mode frequency from 1.33 MHz to 820 kHz and increases the P2 frequency from 260 kHz to 340 kHz. However, this change increases the amplitude of the bending mode. Further, configuring a slot or trench near the pitch 2 nodal line decreases the bending frequency from 1.33 MHz for a normal slider (Case1) to about 920 kHz, without increasing the bending mode amplitude (Case4) such as with the thinner slider (Case2), the center trench slider (Case3), and the multiple P2 trench slider (Case5). The data depicted in FIG. 9 may be used to optimize or otherwise develop the use of slider compliance-enhancing features according to a particular slider design and implementation.

It should be understood that although various embodiments of the present invention are described in the context of a compliant air bearing slider in a hard disk drive (HDD), the foregoing embodiments are merely exemplary of various implementations of principles of the present technology. Therefore, it should be understood that various embodiments of the invention described herein may apply to any devices, configurations, or systems in which air bearing sliders are employed.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An air bearing slider, comprising:

a compliance-enhancing feature which affects slider bending mode frequency and slider pitch mode frequency, wherein said compliance-enhancing comprises one or more recesses in said slider.

2. The air bearing slider recited in claim 1, wherein said compliance-enhancing feature configures the bending mode frequency of said slider to within 800 kHz of a pitch 2 eigenmode frequency of said slider.

3. The air bearing slider recited in claim 2, further comprising:

a piezoelectric element operating as an active damper by ensuring that said bending mode frequency and said pitch 2 eigenmode frequency are out of phase.

4. The air bearing slider recited in claim 1, wherein said compliance-enhancing feature comprises one or more recesses from a surface of said slider opposing an air bearing surface of said slider.

5. The air bearing slider recited in claim 4, wherein the thickness of said slider is less than 190 microns.

6. The air bearing slider recited in claim 1, wherein said compliance-enhancing feature comprises one or more recesses from an air bearing surface of said slider and one or more recesses from a surface of said slider opposing said air bearing surface.

7. The air bearing slider recited in claim 1, wherein said compliance-enhancing feature comprises one or more recesses substantially transverse to said slider.

8. The air bearing slider recited in claim 1, wherein said compliance-enhancing feature comprises one or more recesses substantially longitudinal to said slider.

9. The air bearing slider recited in claim 1, wherein said compliance-enhancing feature is located approximately coincident with a pitch 2 nodal axis of said slider.

10. The air bearing slider recited in claim 1, wherein said compliance-enhancing feature comprises one or more substantially vertical holes through said slider.

11. The air bearing slider recited in claim 1, wherein said compliance-enhancing feature comprises one or more substantially transverse holes through said slider.

12. The air bearing slider recited in claim 1, wherein said compliance-enhancing feature comprises a through-hole substantially transverse to said slider and located approximately coincident with a pitch 1 nodal axis of said slider.

13. The air bearing slider recited in claim 12, wherein said through-hole has a rectangular profile.

14. The air bearing slider recited in claim 1, wherein said compliance-enhancing feature comprises a trench substantially transverse to said slider and located approximately coincident with a pitch 1 nodal axis of said slider, and wherein the depth of said trench is at least 10 percent of the depth of said slider.

15. The air bearing slider recited in claim 1, wherein said compliance-enhancing feature comprises a trench substantially transverse to said slider and located approximately coincident with a pitch 2 nodal axis of said slider, and wherein the depth of said trench is at least 10 percent of the depth of said slider.

16. A hard disk drive device comprising:

a base;

a magnetic storage medium assembly coupled with said base, said magnetic storage medium rotatable relative to said base; and one or more actuator arms housing a corresponding slider housing a corresponding read/write head for reading data from and writing data to said magnetic storage medium, said slider comprising a compliance-enhancing feature which affects slider bending mode frequency and slider pitch mode frequency, wherein said compliance-enhancing comprises one or more recesses in said slider.

17. The hard disk drive device recited in claim 16, wherein said compliance-enhancing feature configures the bending mode frequency of said slider to within 800 kHz of a pitch 2 eigenmode frequency of said slider.

18. The hard disk drive device recited in claim 16, wherein said compliance-enhancing feature comprises one or more recesses from a surface of said slider opposing said air bearing surface.

19. The hard disk drive device recited in claim 16, wherein said compliance-enhancing feature comprises one or more recesses from a deep etch surface of an air bearing surface of said slider and one or more recesses from a surface of said slider opposing said air bearing surface.

20. The hard disk drive device recited in claim 16, wherein said compliance-enhancing feature comprises one or more recesses substantially transverse to said slider.

21. The hard disk drive device recited in claim 16, wherein said compliance-enhancing feature comprises one or more recesses substantially longitudinal to said slider.

22. The hard disk drive device recited in claim 16, wherein said compliance-enhancing feature comprises one or more substantially vertical holes through said slider.

23. The hard disk drive device recited in claim 16, wherein said compliance-enhancing feature comprises a through-hole substantially transverse to said slider and located approximately coincident with a pitch 1 nodal axis of said slider.

24. The hard disk drive device recited in claim 16, wherein said compliance-enhancing feature comprises a trench substantially transverse to said slider and located approximately coincident with a pitch 1 nodal axis of said slider, and wherein the depth of said trench is at least 10 percent of the depth of said slider.

25. The hard disk drive device recited in claim 16, wherein said compliance-enhancing feature comprises a trench substantially transverse to said slider and located approximately coincident with a pitch 2 nodal axis of said slider, and wherein the depth of said trench is at least 10 percent of the depth of said slider.

* * * * *